Patented Nov. 14, 1950

2,530,273

UNITED STATES PATENT OFFICE 2,530,273

PREPARATION OF ARYL DIKETONES

John O. Van Hook, Philadelphia, and Willard J. Croxall, Bryn Athyn, Pa., assignors to Rohm & Haas Company, Philadelphia, Pa., a corporation of Delaware No Drawing. Application December 11, 1948, Serial No. 64,907

7 Claims. (Cl. 260—590)

This invention concerns a method for preparing diketones. More particularly, it concerns a method for preparing diketones in which a phenyl group is attached to one of the carbonyl groups.

The method comprises reacting a monosubstituted acetylene, $R'C{\equiv}CH$, where $R'$ is a phenyl or alkyl group, with a benzoate ester, $ArCOOR$, in which Ar is an aromatic group of the benzene series and R is a lower alkyl group, in the presence of a quaternary ammonium alkoxide as catalyst.

As an ester, there may be used an ester of benzoic acid and a saturated lower aliphatic monohydric alcohol, ROH, where R is a methyl, ethyl, propyl, or butyl group. Instead of benzoic acid itself there may be used substituted benzoic acids having as ring substituents hydrocarbon groups or halogen groups or other groups which do not react with basic compounds. Thus, there may particularly be present as a ring substituent a methyl, ethyl, isopropyl, butyl, tert.-butyl, octyl, isooctyl, diisobutyl, isononyl, dodecyl, cyclohexyl, benzyl, or phenyl group, Ar as a hydrocarbon group being of prime interest.

The acetylene may be methylacetylene, ethylacetylene, propylacetylene, or butylacetylene, or phenylacetylene, or other mono-hydrocarbon-substituted acetylene. Acetylene itself reacts with the esters of benzoic acid in the presence of the quaternary ammonium alkoxides, but it is difficult to separate from the reaction mixture intermediate products which are ketones. There may be separated, however, as a final product in small yield tribenzoyl benzene.

As catalyst, there is used a quaternary ammonium alkoxide which acts as a strongly basic substance. The most effective quaternary ammonium alcoholates are those in which there is an alkoxide or alcoholate group of one to four carbon atoms and two to four of the N-substituents are methyl groups, the benzyl nucleus being used to supply any remaining N-substituents to form the quaternary group. The alkoxide group may be one such as methoxide, ethoxide, propoxide, or tert.-butoxide. There may be used such benzyl nuclei as benzyl, methylbenzyl, ethylbenzyl, propylbenzyl, isopropylbenzyl, tert.-butylbenzyl, octylbenzyl, bromobenzyl, phenylbenzyl, methoxybenzyl, ethoxybenzyl, ethoxymethylbenzyl, and the like. It is preferred that the molecular weight of the substituting groups in the phenyl ring of the benzyl nucleus be not over 120.

Typical of the quaternary ammonium alcoholates are tetramethylammonium methoxide, tetramethyl ammonium tert.-butoxide, trimethyl benzyl amonium methoxide, trimethyl benzyl ammonium ethoxide, dimethyl dibenzyl ammonium methoxide, dimethyl di(chlorobenzyl) ammonium methoxide, trimethyl methylbenzyl ammonium ethoxide, trimethyl methylbenzyl ammonium tert.-butoxide, trimethyl butylbenzyl ammonium tert.-butoxide, trimethyl 2,4,6-trimethylnonylbenzyl ammonium methoxide, trimethyl di(isopropyl) benzyl ammonium methoxide, trimethyl methoxybenzyl ammonium methoxide, dimethyl di(chlorobenzyl) ammonium propoxide, etc.

There may be used as a solvent an excess of the alkyl benzoate or an ether such as ethyl ether or isopropyl ether, or a hydrocarbon such as benzene or toluene or petroleum ether.

The benzoate and the acetylene are mixed in the presence of catalyst. Approximately equivalent amounts of catalyst are needed, the amount taken being based on the weight of either reactant, although larger amounts may be used. Since an exothermic reaction ensues, it is generally desirable to supply cooling. The reaction may be conducted between 0° C. and 60° C., a range of 25° C. to 45° C. being particularly suitable. The reaction mixture may be stirred, times of four to forty hours for carrying on the reaction being generally suitable.

The reaction mixture is then poured onto ice and acidified. Strong hydrochloric acid may be added or other strong inorganic acid, such as phosphoric or sulfuric. Acetic acid or other organic acid may likewise be used. The aqueous layer which forms is separated and the organic layer taken up in an organic solvent, such as ether. The organic layer can then be conveniently washed and dried. After removal of the solvent, there remains a residue, which is sometimes tarry in nature. There may be distilled therefrom under reduced pressure diketones, beta-alkoxychalcones or beta-alkylacrylophenones, and phenyl di(alkoxy) alkanones.

The latter two types of compounds are converted to the diketones under influence of aqueous acids. Treatment with water in the presence of hydrogen ions causes conversion of at least one alkoxy group to a hydroxyl group followed by splitting out of water or alcohol starting with dialkoxy alkanones or isomerization of the hydroxychalcones starting with an alkoxychalcone. Temperatures of 0° C. to 100° C. may conveniently be used when the system is rendered acidic, a pH of 5 or less being suitable.

The reactions apparently are as follows, although the first indicated reaction product, a benzoyl acetylene, has not been isolated:

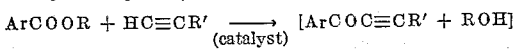

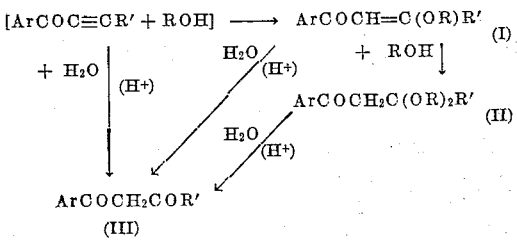

Products I, II, and III have been isolated. A mixture of I and II can readily be separated and by acid hydrolysis converted to III, a diketone having at least one phenyl group attached to a carbonyl group. R' may be a phenyl group or a lower alkyl group.

When R' is hydrogen, as in the case of acetylene itself, compounds of the type of I and II apparently form as intermediates, but at once react at the unsaturated linkage of I and on dealkoxylation of the addition product from one mole of each there can be formed with the new group a quaternary ammonium salt. A total of three moles of products indicated as I and II can also add together to form an addition product. This latter addition product upon dealkoxylation forms a tribenzoyl benzene.

The obtained diketones have many potentially valuable applications. They are compatible with resins, including vinyl resins, and have value as plasticizers. They react with metal salts to form chelates. Based upon this property they may serve as metal deactivators and stabilizers. They may be used as oil additives. They are useful chemical intermediates, reacting with amines, hydroxylamines, and hydrazines.

The invention will be illustrated with some typical procedures.

*Example 1*

In a three-necked flask equipped with a mercury-sealed stirrer, a dropping funnel, a thermometer, and a condenser carrying a drying tube packed with a dehydrated calcium sulfate drying agent was placed 86 grams of a benzyl trimethyl ammonium methoxide solution in methanol. Methanol was stripped from this solution until an amount of methanol remained equivalent to the quaternary ammonium methoxide. Thereto was added 45 grams of methyl benzoate. The temperature was carried to 40° C. and maintained at about this point with the aid of external cooling while 34 grams of phenylacetylene was added. The mixture was stirred for 20 hours, in which time the reaction mixture had become a dark brown. It was poured onto cracked ice and acidified by the addition of strong hydrochloric acid solution. The mixture was then extracted three times with ethyl ether. The combined extracts were washed with sodium bicarbonate solution and dried over a calcium sulfate drying reagent. The ether was stripped off and the residue subjected to fractional distillation at reduced pressure. A first fraction taken off at 60°–90° C./1 mm. reacted with 2,4-dinitrophenylhydrazine to give a product melting at 117°–119° C.

There was then obtained at 150°–160° C./1 mm. 30 grams of an amber-colored oil, from which there separated on standing crystals identified as dibenzoyl methane. The oil was shaken with a methanolic solution of copper acetate to form the copper chelate of this componud, which was removed by filtration. After the methanol had been stripped from the filtrate, the oil was taken up in ether, washed, dried, and distilled. There was obtained 25 grams of a straw-colored liquid, distilling at 145°–155° C./1 mm. and having a refractive index, $n_D^{20}$, of 1.6350. From the methoxyl determination (16.40%) it was calculated that the distillate consisted of 66% of beta-methoxychalcone and 34% of 1,3-diphenyl-3,3-dimethoxy-1-propanone. Some of the distillate was treated with aqueous hydrochloric acid and distilled. The product thus obtained was dibenzoyl methane, the melting point of which was 77°–79° C.

Some of the mixed distillate was treated with phenylhydrazine and acetic acid to form 1,3,5-triphenylpyrazole, melting at 139°–140° C.

By the same procedures there may be reacted ethyl benzoate, propyl benzoate, or butyl benzoate. In each case the final product is the same diketone, dibenzoyl methane. When lower alkyl esters of a hydrocarbon-substituted benzoic acid are used as starting materials, there are obtained in the same way diketones of the formula $ArCOCH_2COC_6H_5$.

Instead of phenylacetylene there may be used a monoalkylacetylene. In such case the end product is $ArCOCH_2COR'$, where R' represents the alkyl group from the acetylene.

*Example 2*

An apparatus, like the one described in Example 1, was charged with 50 grams of benzyl trimethyl ammonium ethoxide in ethanol solution and excess ethanol removed at low pressure until a monoethanolate remained. There was then added 30 grams of ethyl benzoate and then 16 grams of butylacetylene while the temperature was held at 40°–45° C. The mixture was then stirred for five hours and left standing overnight. The procedure described above was pursued with pouring upon cracked ice, acidifying with hydrochloric acid, and extracting with ether. Distillation of the ether extract gives an oil which consists of 1-phenyl-2,4-heptanedione, 1-phenyl-3,3-diethoxy-1-heptanone, and 1-phenyl-3-ethoxy-2-hepten-1-one. Treatment of this oil with hydrochloric acid solution by shaking at room temperature converts the oil practically entirely to 1-phenyl-2,4-heptanedione, which is obtained as an oil.

*Example 3*

In accordance with the same general procedures as described above, there were taken 200 grams of trimethyl benzyl ammonium tert.-butoxide monobutanolate and 100 grams of methyl benzoate and into this mixture was run acetylene gas. The temperature of the mixture was held at 26° to 30° C. and the reaction was carried on for seven hours. A suspension of an orange solid formed in a dark brown liquid. This solid was separated and washed with acetone. Recrystallization from methanol-ether solutions raised but did not limit the melting range. The material was clearly a mixture of compounds. Acidification of the material produced a greasy solid, which was subjected to distillation at low pressures. After considerable evolution of gas there was obtained at 260° C./1 mm. a distillate which after recrystallization from methanol melted at 120°–121° C. and contained by analysis 83.36% of carbon and 5.00% of hydrogen. The mixed melting point with an authentic sample of tribenzoyl benzene was 120.5°–122° C. The product was, therefore, tribenzoyl benzene.

*Example 4*

A two-liter, three-necked flask, equipped with a sealed stirrer and an outlet tube which led through a dry ice-acetone cooled receiver to a high vacuum oil pump, was charged with 450 g. (1.0 mole) of a 40% methanolic solution of benzyl-trimethyl ammonium methoxide. The mixture was stirred and heated at 38° C. at a pressure of 1 mm. for two hours, whereby the excess methanol was removed and 215 g. of a syrupy residue of benzyl trimethyl ammonium methoxide monomethanolate was obtained. The flask was fitted with an addition funnel, the outlet tube was connected to a drying tube at atmospheric pressure, 150 g. (1.0 mole) of methyl p-methylbenzoate and then 102 g. (1.0 mole) of phenylacetylene were added while the mixture was stirred and the temperature was maintained at 35°–40 C. by external cooling. The mixture was stirred at 30°–35° C. for 18 hours after which it was dark brown.

The mixture was poured on ice and made neutral to litmus by the addition of 10% aqueous hydrochloric acid. The resulting organic material was removed by extraction with ether. The extracts were dried over anhydrous calcium sulfate and distilled. After removal of ether and unreacted phenylacetylene and methyl p-methylbenzoate which boiled below 100° C./1 mm. there was obtained 100 grams of an amber-colored oil which distilled at 150°–210° C./1 mm. The residue weighed 50 grams.

The oil was shaken at room temperature with 500 ml. of 5% aqueous hydrochloric acid. The resulting mixture was extracted with ether. The extracts were washed with water until the washings were neutral, dried over anhydrous magnesium sulfate and distilled, first to remove ether and then in vacuo. There was obtained as a pale yellow, viscous liquid 67 g. of 4-methyl benzoyl-benzoylmethane which boiled at 180°–190° C./1 mm.

Substitution of other alkylbenzoate for the methyl-benzoate above leads to the corresponding alkylbenzoyl-benzoylmethane.

By a similar reaction of phenylacetylene with methyl 4-chlorobenzoate there was obtained 4-chlorobenzoyl-benzoylmethane which melted at 85°–87° C. when it was crystallized from methanol.

We claim:

1. A process which comprises reacting the monosubstituted acetylene, $R'C \equiv CH$, where $R'$ is a member of the class consisting of the phenyl group and alkyl groups of not over four carbon atoms, with a benzoate ester, ArCOOR, wherein Ar is a hydrocarbon group and R is a lower alkyl group, in the presence of a quaternary ammonium alkoxide as catalyst, the alkoxide group having not over four carbon atoms and two to four of the N-substituents being methyl groups with the benzyl group satisfying any remaining valence to form a quaternary group.

2. A process which comprises reacting phenylacetylene and a benzoate ester, ArCOOR, wherein Ar is a hydrocarbon group and R is a lower alkyl group, in the presence of a quaternary ammonium alkoxide as catalyst, the alkoxide group having not over four carbon atoms and two to four of the N-substituents being methyl groups with the benzyl group satisfying any remaining valence to form a quaternary group.

3. The process of claim 2 in which the benzoate ester is methyl benzoate.

4. The process of claim 3 in which the quaternary ammonium alkoxide is benzyl trimethyl ammonium methoxide.

5. A process which comprises reacting a monoalkyl-acetylene in which the alkyl group contains not over four carbon atoms and a benzoate ester, ArCOOR, wherein Ar is a hydrocarbon group and R is a lower alkyl group, in the presence of a quaternary ammonium alkoxide as catalyst, the alkoxide group having not over four carbon atoms and two to four of the N-substituents being methyl groups with the benzyl group satisfying any remaining valence to form a quaternary group.

6. The process of claim 5 in which the benzoate ester is methyl benzoate.

7. The process of claim 6 in which the quaternary ammonium alkoxide is benzyl trimethyl ammonium methoxide.

JOHN O. VAN HOOK.
WILLARD J. CROXALL.

No references cited.